(12) United States Patent
Suresh et al.

(10) Patent No.: US 9,611,422 B2
(45) Date of Patent: Apr. 4, 2017

(54) METHODS OF OBTAINING HYDROCARBONS USING SUSPENSIONS INCLUDING ORGANIC BASES

(71) Applicant: Baker Hughes Incorporated, Houston, TX (US)

(72) Inventors: Radhika Suresh, Sugar Land, TX (US); Valery N. Khabashesku, Houston, TX (US); Oleksandr V. Kuznetsov, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 114 days.

(21) Appl. No.: 14/289,873

(22) Filed: May 29, 2014

(65) Prior Publication Data
US 2015/0344769 A1  Dec. 3, 2015

(51) Int. Cl.
| | |
|---|---|
| C09K 8/592 | (2006.01) |
| E21B 43/16 | (2006.01) |
| C09K 8/584 | (2006.01) |
| C10G 1/04 | (2006.01) |

(52) U.S. Cl.
CPC ............. *C09K 8/592* (2013.01); *C09K 8/584* (2013.01); *C10G 1/045* (2013.01); *E21B 43/16* (2013.01); *C09K 2208/10* (2013.01)

(58) Field of Classification Search
None
See application file for complete search history.

(56) References Cited

U.S. PATENT DOCUMENTS

| | | | | |
|---|---|---|---|---|
| 3,259,578 | A * | 7/1966 | Dickson | B01D 19/0413 508/448 |
| 3,271,307 | A * | 9/1966 | Dickson | C08G 73/0206 166/275 |
| 3,454,095 | A * | 7/1969 | Webster | C09K 8/592 166/270.2 |
| 3,577,249 | A * | 5/1971 | Dybalski | C08K 5/17 106/269 |
| 3,581,823 | A * | 6/1971 | Feuerbacher | C09K 8/86 166/267 |
| 4,156,463 | A * | 5/1979 | Hall | E21B 43/24 166/272.4 |

(Continued)

FOREIGN PATENT DOCUMENTS

WO  2011154693 A1  12/2011

OTHER PUBLICATIONS

Orr et al., Reducing Steam Oil Ratio in Steam-Assisted Gravity Drainage, CSUG/SPE 136851, Canadian Unconventional Resources & International Petroleum Conference held in Calgary, Alberta, Canada, Oct. 19-21, 2010. 13 pages.

(Continued)

*Primary Examiner* — Angela M DiTrani
*Assistant Examiner* — Anuradha Ahuja
(74) *Attorney, Agent, or Firm* — TraskBritt

(57) ABSTRACT

Suspensions comprising an organic base and at least one carrier fluid. The organic base comprises an amine group and at least one hydrophobic group attached to the amine group. The at least one hydrophobic group may be functionalized with one or more functional groups. Methods of extracting and obtaining a hydrocarbon material from a subterranean formation or bitumen using the suspension are disclosed.

14 Claims, 2 Drawing Sheets

(56) References Cited

U.S. PATENT DOCUMENTS

| | | | |
|---|---|---|---|
| 4,212,353 A * | 7/1980 | Hall | C09K 8/58 166/267 |
| 4,372,383 A * | 2/1983 | Ames | E21B 43/40 166/266 |
| 4,522,732 A * | 6/1985 | Purcell | C09K 8/592 166/270.1 |
| 4,795,478 A * | 1/1989 | Layrisse et al. | C10L 1/328 137/13 |
| 4,822,501 A | 4/1989 | Debons et al. | |
| 4,923,009 A | 5/1990 | Watkins | |
| 6,096,196 A | 8/2000 | Varadaraj et al. | |
| 6,302,209 B1 | 10/2001 | Thompson, Sr. et al. | |
| 7,833,947 B1 | 11/2010 | Kubala | |
| 7,938,183 B2 | 5/2011 | Hart et al. | |
| 8,722,588 B2 | 5/2014 | Zamudio Rivera et al. | |
| 2001/0009889 A1 * | 7/2001 | Waggenspack | C08B 37/003 507/110 |
| 2002/0098997 A1 | 7/2002 | Audibert-Hayet et al. | |
| 2008/0096772 A1 * | 4/2008 | Wilkes | C09K 8/524 507/90 |
| 2009/0218099 A1 * | 9/2009 | Hart | E21B 43/2408 166/303 |
| 2011/0009299 A1 * | 1/2011 | van Zanten | C09K 8/36 507/129 |
| 2012/0015852 A1 * | 1/2012 | Quintero | C09K 8/032 507/112 |
| 2012/0165233 A1 | 6/2012 | Aytkhozhina et al. | |
| 2012/0245058 A1 * | 9/2012 | Monteiro | C09K 8/032 507/110 |
| 2012/0285694 A1 | 11/2012 | Morvan et al. | |
| 2012/0289437 A1 * | 11/2012 | David | C09K 8/34 507/117 |
| 2013/0072405 A1 * | 3/2013 | Favero | C09K 8/12 507/225 |
| 2013/0081808 A1 | 4/2013 | Zeidani et al. | |
| 2013/0200291 A1 * | 8/2013 | Jessop | B01F 17/0042 252/61 |
| 2014/0027116 A1 * | 1/2014 | Suresh | C09K 8/56 166/292 |

OTHER PUBLICATIONS

Srivastava et al., A Chemical Additive for Enhancing Thermal Recovery of Heavy Oil, SPE 128327, SPE EOR Conference at Oil & Gas West Asia in Muscat, Oman, Aprill 1-13, 2010, 7 pages.
Srivastava et al., Development of a Steam-Additive Technology to Enhance Thermal Recovery of Heavy Oil, SPE 1333465, SPE Annual Technical Conference and Exhibition in Florence, Italy, Sep. 19-22, 2010, 9 pages.
Srivastava et al., Laboratory Evaluation of a Chemical Additive to Increase Production in Steam Assisted Gravity Drainage (SAGD), SPE 128621, SPE Improved Oil Recovery Symposium held in Tulsa, Oklahoma, Apr. 24-28, 2010, 8 pages.
Wikipedia, Oil Additive, http://en.wikipedia.org/wiki/Oil_additive, visited Apr. 25, 2014, 4 pages.
International Search Report for International Application No. PCT/US2015/032146, dated Aug. 25, 2015, 3 pages.
International Written Opinion for International Application No. PCT/US2015/032146, dated Aug. 25, 2015, 10 pages.

* cited by examiner

METHODS OF OBTAINING HYDROCARBONS USING SUSPENSIONS INCLUDING ORGANIC BASES

TECHNICAL FIELD

Embodiments of the disclosure relate generally to methods of obtaining a hydrocarbon from a hydrocarbon-containing material, such as a subterranean formation or bitumen. More particularly, embodiments of the disclosure relate to methods of forming a flooding suspension including an organic base and to stabilized emulsions formed by the organic base and a hydrocarbon material, and to methods of obtaining hydrocarbons using the stabilized emulsion.

BACKGROUND

Enhanced oil recovery includes processes for increasing the amount of hydrocarbon material (e.g., crude oil, natural gas, etc.) recovered from a subterranean formation. Methods of enhanced oil recovery include water flooding, steam assisted gravity drainage (SAGD), steam flooding (e.g., cyclic steam stimulation (CSS)), and related methods. In these processes, a carrier fluid (e.g., water, brine, steam, etc.) is injected into a subterranean formation through injection wells to heat and/or sweep a hydrocarbon material contained within interstitial spaces (e.g., pores, cracks, fractures, channels, etc.) of the subterranean formation toward production wells offset from the injection wells.

However, heavy hydrocarbon materials such as hydrocarbons having an API gravity of about 22 (specific gravity of about 0.92) or lower, or bitumen (e.g., bituminous sands including oil sands and tar sands) often exhibit a high viscosity and, therefore, are often difficult to produce. The high viscosity of such heavy hydrocarbons makes them difficult to transport from a subterranean formation.

One method of lowering the viscosity of hydrocarbons in subterranean formations is to flood the formation with steam. Steam increases the temperature of the hydrocarbons in the formation, which lowers the viscosity of the hydrocarbons and allows the hydrocarbons to drain or be swept toward an oil well to be produced. Steam can also condense into water, which can then act as a low viscosity carrier phase for an emulsion of the hydrocarbon and the water, allowing heavy hydrocarbons to be more easily produced. One or more additives may be added to the carrier fluid to assist in the extraction and subsequent processing of the hydrocarbon material. However, many of the additives conventionally used to assist in the extraction and subsequent processing of hydrocarbon materials may not reduce the viscosity of the heavy hydrocarbons enough to effectively transport and recover the heavy hydrocarbons.

BRIEF SUMMARY

Embodiments disclosed herein include methods of obtaining hydrocarbon material from a subterranean formation or from bitumen, as well as related suspensions including an organic base. For example, in accordance with one embodiment, a method of obtaining a hydrocarbon material comprises combining an organic base comprising a base group and a hydrophobic group with a carrier fluid to form a suspension, contacting at least one of a subterranean formation comprising bitumen and a slurry comprising bitumen with the suspension to form an emulsion comprising at least one of a cationic surfactant and an anionic surfactant, the organic base, and the carrier fluid, and separating a hydrocarbon material from the emulsion.

In additional embodiments, a method of extracting a hydrocarbon material comprises mixing a compound comprising at least one amine group and at least one hydrophobic group with a carrier fluid to form a mixture, contacting a hydrocarbon-containing material with the mixture and reacting the mixture with acids present in the hydrocarbon-containing material to form an emulsion comprising surfactants where the mixture contacts the hydrocarbon-containing material, transporting the emulsion, and removing the hydrocarbons from the emulsion.

In further embodiments, a suspension for removing hydrocarbons from a subterranean formation comprises a carrier fluid comprising at least one of water and steam, an organic base comprising an amine group and at least one hydrophobic group comprising at least another amine group, anionic surfactants comprising anions of the organic base, and cationic surfactants comprising cations of an acid present in a hydrocarbon-containing material.

DETAILED DESCRIPTION

Illustrations presented herein are not meant to be actual views of any particular material, component, or system, but are merely idealized representations that are employed to describe embodiments of the disclosure.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for recovering hydrocarbons from a hydrocarbon-bearing subterranean formation. Only those process acts and structures necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. Additional acts or materials to extract a hydrocarbon material from a subterranean formation or from bitumen may be performed by conventional techniques.

Organic bases for enhanced oil recovery are described as well as methods of forming a suspension including the organic base. The organic base includes one or more active organic sites and one or more hydrophobic groups. The organic base may be mixed with a carrier fluid to form a mixture including the organic base and the carrier fluid (e.g., liquid water, condensate, steam, etc.). Upon contacting an acid group in a hydrocarbon-containing material, the mixture of the carrier fluid and the organic base may form a suspension including surfactants formed in situ at the point of contact between the organic base and the hydrocarbon-containing material. The suspension may also include unreacted organic base, the hydrocarbon-containing material, and the carrier fluid. As used herein, an "organic base" refers to a compound having a general formula of R—NR'R", wherein R, R', and R" may include a hydrogen atom or a hydrocarbon group. The hydrocarbon group may be a hydrophobic group including one or more carbon atoms and may include one or more functional groups such as an alkyl group, an alkenyl group, an alkynyl group, a hydroxyl group, an organohalide group, a halide group, a carbonyl group, an amine group, an organosulfur group, an epoxy group, and a polyamine group. In some embodiments, R, R', and R" may each include the same group, or may be different from one another.

Figure 1:
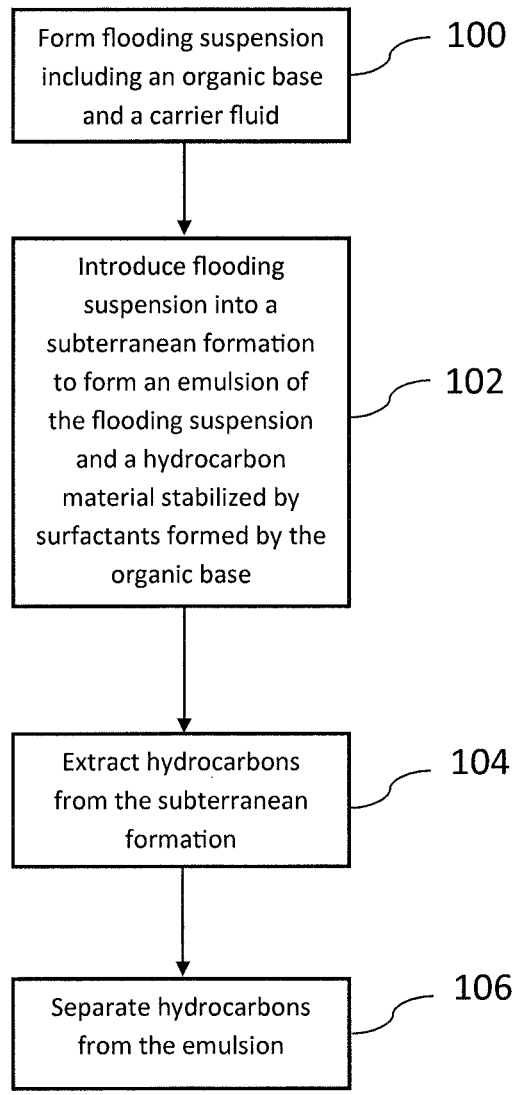
FIG. 1 is a simplified flow diagram depicting a method of extracting hydrocarbons from a subterranean formation, in accordance with embodiments of the disclosure.

Referring to FIG. 1, a simplified flow diagram illustrating a method of obtaining a hydrocarbon material from a subterranean formation, in accordance with embodiments of the disclosure is shown. The method may include a suspension formation process 100 including forming a flooding suspension by combining an organic base including a base group and a hydrophobic group with a carrier fluid that may include at least one of water and steam; a flooding process 102 including introducing the flooding suspension into a subterranean formation to form an emulsion of the flooding suspension and a hydrocarbon material stabilized by surfactants including at least one of a cationic surfactant and an anionic surfactant formed by the organic base; an extraction process 104 including flowing (e.g., driving, sweeping, forcing, etc.) the stabilized emulsion from the subterranean formation; and a separation process 106 including separating the hydrocarbon material from the emulsion.

The suspension formation process 100 may include forming a suspension including the organic base and at least one carrier fluid. As used herein, the term "suspension" means and includes a material including at least one carrier fluid in which the organic base is substantially uniformly dispersed. The suspension may be a flooding suspension used in enhanced oil recovery processes, such as used in water flooding, CSS, or SAGD processes. The organic base of the flooding suspension may be compatible with other components (e.g., materials, constituents, etc.) of the flooding suspension. As used herein, the term "compatible" means that a material does not impair the functionality of the organic base or cause the organic base to lose functionality as a surfactant precursor.

The organic base may be structured and formulated to exhibit selectable and controllable reactive properties. The organic base may be formed of and include at least one base group and at least one hydrophobic group attached to the at least one base group. The organic base may be formed of and include a material that reacts with a material present in the hydrocarbon material. By way of non-limiting example, contacting a hydrocarbon-containing material with a flooding suspension including the organic base may form in situ surfactants at locations where the suspension contacts the hydrocarbon-containing material. The organic base may react with acids (e.g., naphthenic acids) present in the hydrocarbon-containing material to from an emulsion including in situ formed surfactants at an interface between the hydrocarbon material and the flooding suspension. The surfactants may be formed at and gather (e.g., agglomerate) at, adhere to, and/or absorb to interfaces of the hydrocarbon material and the flooding suspension to form an emulsion comprising units (e.g., droplets) of one of the hydrocarbon material and the suspension dispersed in the other of the hydrocarbon material and the suspension. The emulsion may be stabilized by the surfactants formed by the organic base. The surfactants formed by the reaction of the organic base and the hydrocarbon may prevent the dispersed material (e.g., the hydrocarbon material, or the suspension) from coalescing, and may thus maintain the dispersed material as units throughout the other material.

The reaction of the organic base with organic acid sites present in the hydrocarbon-containing material may form a foam, such as in a saponification or an acid-base neutralization reaction. The foam may reduce interfacial tension between the hydrocarbon and the flooding suspension. Decreasing interfacial tension between, for example, a dispersed hydrocarbon phase and a continuous suspension phase may increase the hydrocarbon mobility and recovery from a subterranean formation including the hydrocarbon or from a slurry of bitumen including the hydrocarbon. Where the hydrocarbon-containing material includes bitumen, the surfactants may enable easier removal (e.g., shearing) of the bitumen in mining processes.

The surfactants are formed in situ in an acid-base neutralization reaction between the organic base and acids present in the hydrocarbon-containing material. The reaction between the organic base and the acids of the hydrocarbon-containing material may form a cation of the organic base (i.e., a conjugate acid) and an anion of the acid in the hydrocarbon-containing material (i.e., a conjugate base). The acid-base reaction may occur at an interface of the hydrocarbon-containing material and the flooding suspension and may form the in situ surfactants at the point of contact between the hydrocarbon and the organic base. In some embodiments, the acid-base reaction forms a cationic surfactant including a conjugate acid of the organic base. The acid-base reaction may also form an anionic surfactant including a conjugate base of acids present in the hydrocarbon. Cationic surfactants including conjugate acids of the organic base may reduce the interfacial tension between an emulsion comprising heavy hydrocarbons and the flooding suspension.

The organic base may be formed of and include a base group, such as a nitrogen-containing group. In some embodiments, the base group includes at least one amine group. At least one hydrophobic group may be attached to the at least one amine group. The hydrophobic group may enable the generated surfactants to remain in and be soluble within an organic phase of the hydrocarbons. The hydrophobic group present in the organic base may increase the interaction between the hydrophobic part of the organic base and the hydrocarbon. The hydrophobic group may include one or more functional groups including one or more of an alkyl group, an alkenyl group, an alkynyl group, a hydroxyl group, an organohalide group, a halide group, a carbonyl group, an amine group, an organosulfur group, an epoxy group, and a polyamine group.

The amine of the base group may be a primary amine ($RNH_2$), a secondary amine (RR'NH), or a tertiary amine (RR'R"N). At least one of the groups attached to the amine (e.g., R, R', or R") may be a hydrophobic group. In some embodiments, more than one hydrophobic group may be attached to the amine. For example, where the amine is a secondary amine, two hydrophobic groups may be attached to the amine. The hydrophobic groups may comprise the same group or may comprise different groups having different functional groups.

The organic base may include more than one base group. In some embodiments, the organic base is a polyamine (e.g., a compound including a plurality of amine groups), such as a diamine, a triamine, a tetraamine, etc. For example, the organic base may include more than one site at which the organic base may participate in the acid-base neutralization reaction with acids of the hydrocarbon material to form the surfactant. The organic groups attached to each of the amine groups may be the same or different than organic groups attached to the other amine groups of the organic base. Multiple base sites may increase the effectiveness of the organic base at forming surfactants for mobilizing heavy hydrocarbon materials. In some embodiments, the organic base includes ethylene diamine, propylene diamine, butylene diamine, or mixtures thereof. The organic base may include polymers with pendant amine groups (e.g., substituted amine functional groups). For example, the organic base may include a polymer including side-chains with amine functional groups. The organic base may include poly ethyleneimine, poly(vinylpyridine), polyvinyl imidazole, and copolymers thereof (e.g., a copolymer of poly ethyleneimine and one or more of poly(vinylpyridine) and polyvinyl imidazole, or a copolymer of poly(vinylpyridine) with polyvinyl imidazole).

The organic base may include one or more organic groups (R, R', or R") attached to the amine group. At least one of the organic groups may be hydrophobic. The hydrophobic group may increase the effectiveness of a surfactant formed by the organic base. For example, the chemistry of the hydrophobic group may determine how the conjugate acid of the organic base interacts with the hydrocarbon within the emulsion. In some embodiments, a highly hydrophobic conjugate acid may cause the hydrophobic portion of the surfactant to interact with the hydrocarbon material while the protonated amine group of the conjugate acid interacts with the aqueous phase (e.g., flooding suspension). Accordingly, the surfactants may have a long, nonpolar part (e.g., the hydrophobic group) that extends into and interacts with the nonpolar hydrocarbon, and a polar, ionic head group (e.g., the base group) that extends into and interacts with the aqueous suspension.

The hydrophobic group may include one or more of an alkyl group, an alkenyl (C=C) group, an alkynyl (C≡C) group, a hydroxyl group, an organohalide group, a halide group, a carbonyl group, an amine group, an organosulfur group, and an epoxy group. The hydrophobic group may include a polymer comprising monomers that each include at least one amine group.

The hydrophobic group may include one or more alkyl groups. As used herein, the term "alkyl" refers to a compound including one or more of a methyl, ethyl, propyl, butyl, pentyl, hexyl, heptyl, octyl, dodecyl, and/or octadecyl group. In some embodiments, the organic base includes an alkyl amine, such as methylamine, ethylamine, propylamine, butylamine, pentylamine, hexylamine, heptylamine, octylamine, dodecylamine, or octadecylamine. The organic compound may include propyl amine, butyl amine, or a mixture thereof. An increasing carbon content of the alkyl group of the hydrophobic group may increase the hydrophobicity of the hydrophobic group.

The organic base may include a secondary or tertiary amine including a plurality of alkyl groups attached to the secondary or tertiary amine. For example, the organic base may include a dialkylamine or a trialkylamine such as dipropylamine, tripropylamine, dibutylamine, tributylamine, etc. In some embodiments, the hydrophobic group may include one or more cycloalkanes, such as cyclopropane, cyclobutane, cyclopentane, cyclohexane, and cycloparaffins (e.g., cycloalkanes having greater than about 20 carbon atoms). In some embodiments, one or more hydrogen atoms of the alkyl group may be substituted with one or more other functional groups, such as a hydroxyl group, a halide group, an aryl group (e.g., an aralkyl or an alkaryl group), or a sulfur-containing group. In some embodiments, the organic base may include a mixture of an alkyl amine and another alkyl amine with at least some of the hydrogen groups substituted with one or more functional groups.

The hydrophobic group may include one or more alkenyl groups. The hydrophobic group may include an ethenyl group, a propenyl group, a methylethenyl group, a butenyl group, a pentenyl group, a hexenyl group, a heptenyl group, an octenyl group, a dodecenyl group, and/or an octadecenyl group. The double bond may be located at any location along the alkenyl chain (e.g., 2-propenyl, 1-propenyl). The hydrophobic group may include one or more alkynyl groups. In some embodiments, the hydrophobic group includes ethyne (acetylene), propyne, butyne, pentyne, hexyne, heptyne, octyne, dodecyne, and/or octadecyne. The triple bond may be located at any location along the alkynyl chain. In some embodiments, the hydrophobic group may include one or more alkenyl or alkynyl groups, in addition to one or more other functional groups. For example, the hydrophobic group may include one or more halide groups, hydroxyl groups, sulfur-containing groups, aryl groups, and amine groups. In some embodiments, the hydrophobic group includes one or more alkenyl or alkynyl groups and one or more halide groups.

The hydrophobic group may include one or more hydroxyl groups. In some embodiments, the hydrophobic group includes an alcohol group. For example, the hydrophobic group may include methanol, ethanol, propanol, butanol, pentanol, hexanol, heptanol, octanol, dodecanol, and/or octadecanol. The hydroxyl group may be attached at any location of the carbon chain. One or more of the alkyl groups, alkenyl groups, or alkynyl groups described above may include one or more hydroxyl groups. In some embodiments, the hydrophobic group is ethanol amine, diethanol amine, triethanol amine, or a mixture thereof.

The hydrophobic group may include at least one of a carbonyl group (a functional group including a carbon-oxygen double bond (C=O)), such as a ketone, an aldehyde, a carboxylate group (RCOO—), an ester group, and an alkoxy group (an alkyl group with a carbon-oxygen single bond (R—O—R')). For example, the hydrophobic group may include an aldehyde, such as alkyl aldehydes including methanal (formaldehyde), ethanal (acetaldehyde), propenal (acrolein), butanal (butyraldehyde), pentanal, hexanal, heptanal, octanal, dodecanal, and octadecanal. One or more carbon atoms of the aldehyde may include one or more additional functional groups, such as a halide group, a hydroxyl group, a sulfur-containing group, an aryl group, or an amine group.

The hydrophobic group may include a ketone, including diketones and cyclic ketones. The ketones may be saturated or unsaturated and may be either symmetric or asymmetric. The ketones may include a propanone (acetone), butanone, a pentanone, a hexanone, a heptanone, octonone, dodecanone, and/or octadecanone groups. Non-limiting examples of cyclic ketones include isophorene, cyclopropanone, cyclobutanone, cyclopentanone, cyclohexanone, muscone, and 3-methylpentadecanone.

The hydrophobic group may include a carboxylate group (RCOO). The carboxylate group may include a carboxylic acid group, such as methanoic acid, ethanoic acid, propanoic acid, butanoic acid, pentanoic acid, hexanoic acid, heptanoic acid, octanoic acid, nonanoic acid, decanoic acid, dodecanoic acid, and/or octadecanoic acid (stearic acid). In some embodiments, it may be desirable to decrease the hydrophobicity of the hydrophobic group. A carboxylate group may decrease the hydrophobicity of the organic base. In some embodiments, the organic base includes one or more carboxylate groups and one or more of an alkyl group, an alkenyl group, an alkynyl group, a hydroxyl group, a ketone, and an aldehyde, and an amine group.

The hydrophobic group may include an ester group. The ester may include methyl acetate, ethyl acetate, propyl acetate, butyl acetate, pentyl acetate, hexyl acetate, heptyl acetate, octyl acetate, dodecyl acetate, octadecyl acetate, isoamyl acetate, ethyl butyrate, isopropyl butanoate, ethyl propanoate, and ethyl benzoate.

In some embodiments, the hydrophobic group includes one or more halogen atoms, such as in organohalides. For example, the hydrophobic group may include one or more of fluorine, chlorine, bromide, and iodine. Non-limiting examples of halogen-containing compounds include haloalkanes (alkyl halides), haloalkenes (alkenyl halides), haloaromatics (aryl halides), and acyl halides (RCOX, where X is a halide). By way of non-limiting example, the hydrophobic group may include methyl halide, ethyl halide, propyl halide, butyl halide, pentyl halide, hexyl halide, heptyl halide, octyl halide, dodecyl halide, octadecyl halide, or an aryl halide (e.g., a chlorobenzene). The halide may be attached to one or more of the carbon atoms in the hydrophobic group. In some embodiments, a halogen atom may be directly attached to the base group of the organic base rather than, or in addition to, attached to a hydrophobic group of the organic base.

In some embodiments, the hydrophobic group includes an alkoxy group. The alkoxy group may include a methoxy, ethoxy, propoxy, butoxy, pentoxy, hexoxy, hepoxy, octoxy, dodecoxy, or octadecoxy group.

In some embodiments, the hydrophobic group may include one or more amine groups. Thus, the organic base may include a base group including at least one amine group and a hydrophobic group including at least another amine group. By way of non-limiting example, the hydrophobic compound may include an amide group (R—CONR'R"), an imide group (a nitrogen atom with two acyl groups bonded thereto ((RCO)$_2$NR'), an imine group (R—C=N), a nitrate (RONO$_2$), a nitroso group (R—N=O), a nitro group (RNO$_2$), and a pyridyl group (RC$_5$H$_4$N). The hydrophobic group may also include one or more of a hydrozone group (RR'C=NNH$_2$), an azide group (R—N=N=N), an azo group (RN=NR'), a carboxyamide group (R—CO—NR'R", e.g., acetamide), a cyanate group (R—C=N), and an isocyanate group (RN=C=O). In some embodiments, the hydrophobic group may include one or more of a nitrogen-nitrogen double bond, a nitrogen-carbon double bond, and a nitrogen-carbon triple bond.

In some embodiments, the hydrophobic group may include an amide, a sulfonamide (RSONHR'R"), or a phosphoamide (RPONHR'R"). The amide may include methanamide, ethanamide, propanamide, propamide, butaminde, pentamide, hexamide, heptamide, octanamide, nonamide, decanamide, dodecanamide, and/or octadencamide. Sulfonamides may include trifluoromethanesulfonamide, methylsulfanamoyl chloride (CH$_4$ClNO$_2$S), methane sulfonamide (CH$_5$NO$_2$S), cyclopropanesulfonamide (C$_3$H$_7$NO$_2$S), 4-nitrobenzenesulfonamide (C$_6$H$_6$N$_2$O$_4$S), and benzenesulfonamide (C$_6$H$_7$NO$_2$S).

The hydrophobic group may include an imide, such as N-ethylmaleimide or phthalimide. In other embodiments, the hydrophobic group includes an imine. The imine may include ethanimine, a propanimine, a butanimine, a pentanimine, a hexanimine, a heptanimine, an octanimine, a dodecanimine, and/or an octadecanimine.

In other embodiments, the hydrophobic group may include an azo compound. The azo compound may be an aryl azo compound or an alkyl azo compound. In other embodiments, the hydrophobic group includes a cyanate group or an isocyanate group.

In other embodiments, the hydrophobic group may include one or more of a nitrate group and a nitro group. By way of non-limiting example, the hydrophobic group may include an alkyl nitrate including methyl nitrate, ethyl nitrate, propyl nitrate, butyl nitrate, pentyl nitrate, hexyl nitrate, octyl nitrate, dodecyl nitrate, octadecyl nitrate, and amyl nitrate. Where the hydrophobic group includes a nitro group, the compound may include nitromethane, nitroethane, nitropropane, nitrobutane, nitropentane, nitrohexane, nitroheptane, nitrooxtane, nitrododecane, and nitrooctadecane. The hydrophobic group may include a pyridine derivate having the general formula RC$_5$H$_4$N, where R may be a hydrophobic group such as an alkyl group, an alkenyl group, an alkynyl group, which may include one or more hydrogen atoms substituted with a halide group, a sulfur-containing group, a hydroxyl group, an amine group, or other functional group. In some embodiments the hydrophobic group is an imidazole-pyridine or an imidazole-pyrazole compound.

The hydrophobic group may include at least one sulfur atom, such as an organosulfur group. Non-limiting examples of organosulfur groups include a thiol group (R—SH), a sulfide group (R—S—R', also known as a thioether), a disulfide group (RSSR'), and a sulfonyl group (a group including a single sulfur atom having two sulfur-oxygen double bonds, RO=S=OR'). The hydrophobic group may include an alkyl thiol where the alkyl has between about one and about twenty carbon atoms. Where the hydrophobic group is a sulfide, the hydrophobic group may include dimethyl sulfide, diethyl sulfide, and polyphenylene sulfide. Where the hydrophobic group includes a sulfonyl group, the hydrophobic group may include dimethyl sulfone, diethyl sulfone, or dipropyl sulfone. The hydrophobic group may also include one or more of a thiocyanate, an isothiocyanate (R—N=C=S), a thione (RCSR'), or a thial (RCSH). The R and R' group of each of the sulfur-containing groups above may be any hydrophobic group, including an alkyl group, an alkenyl group, an alkynyl group, an aryl group, each of which may include one or more hydrogen atoms substituted with one or more halides, hydroxyl groups, amine groups, or sulfur-containing groups. In some embodiments, the organic base includes a hydrophobic group that includes at least one nitrogen atom and at least one sulfur atom. For example, the organic base may include molecules such as asphaltenes.

The hydrophobic group may include one or more epoxide groups, and may also include polymers formed from reacting epoxide units (e.g., an epoxy). For example, the hydrophobic group may include polyethylene glycol (polyethylene oxide) or polypropylene glycol. The hydrophobic group may include an epoxy resin that is reacted with a polyfunctional amine, phenol, alcohol, or thiol.

The hydrophobic group may include a polymer having at least one amine functional group. The polymer may be formed of monomers that each includes at least one amine functional group. Non-limiting examples of such polymers include polyacrylamide, poly(N-isopropylacrylamide), polyethylenimine, polyvinylpyrrolidone (PVP), or other polymers including one or more nitrogen atoms. In some embodiments, the organic base includes a polymer having amine functional groups. The hydrophobic group may include a polymer including side-chains with amine functional groups. The hydrophobic group may include polyethyleneimine, poly(vinylpyridine), polyvinyl imidazole, and copolymers thereof.

In some embodiments, the hydrophobic group of the organic base may include one or more of an alkyl group, an alkenyl group, an alkynyl group, a hydroxyl group, an organohalide group, a halide group, a carbonyl group, an amine group, an organosulfur group, and an epoxy group, and at least another of an alkyl group, an alkenyl group, an alkynyl group, a hydroxyl group, an organohalide group, a halide group, a carbonyl group, an amine group, an organosulfur group, and an epoxy group. In other embodiments, the organic base may include more than one hydrophobic group and each hydrophobic group may include one or more different functional groups than the other hydrophobic groups.

The flooding suspension may include one or more organic bases mixed with one or more of another organic base. In other embodiments, an organic base comprising a primary amine may be mixed with an organic base comprising a secondary amine or a tertiary amine. In yet other embodiments, at least a first organic base including hydrophobic groups with one or more functional groups may be mixed with another organic base including hydrophobic groups that are different than the hydrophobic groups of the at least a first organic base.

The flooding suspension may include nanomaterials (e.g., nanoparticles) with an amine functionalized surface. As used herein, the term "nanoparticle" means and includes a particle having an average particle width or diameter of less than about 1,000 nm and the term "nanomaterial" means and includes a material having at least one dimension (e.g., length, width, height) of less than about 1,000 nm. In some embodiments, nanomaterials may include a core of one or more of a silica, a metal, or a metal oxide. By way of non-limiting example, the nanomaterials may have a core including silica, iron, titanium, germanium, tin, lead, zirconium, ruthenium, nickel, cobalt, magnesium, oxides thereof, and combinations thereof. In other embodiments, the core may include a carbon-based material or a carbon nanotube. Surfaces of the nanomaterials may be surface modified or functionalized with amine functional groups. The amine functional groups may include primary amines, secondary amines, and/or tertiary amines. The amine group may include one or more hydrophobic groups, including any of the hydrophobic groups described above. In some embodiments, a nanomaterial may be functionalized with a plurality of primary amines, secondary amines, and tertiary amines. In other embodiments, the flooding suspension may include nanomaterials wherein at least some of the nanomaterials are functionalized with primary amines, at least some of the nanomaterials are functionalized with secondary amines, and at least some of the nanomaterials are functionalized with tertiary amines. The flooding suspension may include the organic base and at least some amine functionalized nanoparticles. The amine functionalized nanomaterials may have a concentration of between about 20 ppm and about 1,000 ppm, such as between about 20 ppm and about 100 ppm, between about 100 ppm and about 250 ppm, between about 250 ppm and about 500 ppm, or between about 500 ppm and about 1,000 ppm in the flooding suspension.

The organic base and the amine functionalized nanomaterials may be stable at high temperatures and high pressures found within subterranean formations. Conventional additives may degrade or otherwise lose functionality at temperatures in excess of about 250° C. However, the organic bases and amine functionalized nanomaterials described herein may be stable at high temperatures that may be encountered within a subterranean formation. For example, the organic base and the functionalized nanomaterials may be stable at temperatures up to about 400° C. In some embodiments, the organic base is exposed to a temperature between about 200° C. and about 400° C., such as between about 200° C. and about 300° C., or between about 300° C. and about 400° C., and may remain stable. The carrier fluid may be heated prior to mixing the organic base or surface modified nanomaterials with the carrier fluid to increase the solubility of the organic base or nanomaterials within the carrier fluid. In some embodiments, the carrier fluid may be heated to between about 50° C. and about 100° C., such as between about 50° C. and about 75° C. or between about 75° C. and about 100° C. prior to mixing the organic base or the nanomaterials with the carrier fluid.

The carrier fluid of the flooding suspension may include any flowable material that is compatible with the organic base. The carrier fluid may, for example, comprise an aqueous material. Non-limiting examples of suitable aqueous materials include fresh water, seawater, steam, brines (e.g., mixtures of water and at least one salt, such as water and at least one of ammonium chloride, calcium chloride, calcium bromide, magnesium boride, potassium chloride, potassium formate, sodium chloride, sodium bromide, sodium formate, zinc bromide, zinc formate, and zinc oxide), aqueous-based foams, water-alcohol mixtures, or combinations thereof.

The concentration of the organic base in the flooding suspension may be tailored to the amount and material composition of the hydrocarbon-containing material contained within the subterranean formation. The flooding suspension may include a sufficient amount of the organic base to facilitate removal (e.g., detachment) of the hydrocarbon material from surfaces of the subterranean formation. In addition, the flooding suspension may include a sufficient amount of the organic base to facilitate the formation of a stabilized emulsion of the hydrocarbon material and the flooding suspension. By way of non-limiting example, the organic base may be mixed with the carrier fluid to form the flooding suspension comprising between about 20 ppm and about 1,000 ppm of the organic base, such as between about 20 ppm and about 100 ppm, between about 100 ppm and about 250 ppm, between about 250 ppm and about 500 ppm, or between about 500 ppm and about 1,000 ppm of the organic base. The concentration of the organic base may be such that the flooding suspension exhibits a pH between about 8.0 and about 12.0, such as between about 8.0 and 10.0, or between about 10.0 and about 12.0.

In addition, the flooding suspension may, optionally, include at least one additive. By way of non-limiting example, the additive may be at least one of a surfactant, a catalyst, a dispersant, a scale inhibitor, a scale dissolver, a defoamer, a biocide, or another additive used in the well service industry. The flooding suspension may be substantially homogeneous (e.g., the organic base compounds and the additive, if present, may be uniformly dispersed throughout the flooding suspension), or may be heterogeneous (e.g., the organic base compounds and the additive, if present, may be non-uniformly dispersed throughout the flooding suspension).

With continued reference to FIG. 1, the flooding process 102 may include introducing the flooding suspension including the organic base into a subterranean formation to detach a hydrocarbon material from surfaces of the subterranean formation and form a soap. The flooding suspension may contact the subterranean formation to form an emulsion including the organic base, the carrier fluid, and at least one of a cationic surfactant and an anionic surfactant formed from a reaction of the organic base and an acid within a hydrocarbon. The flooding suspension may be provided into the subterranean formation through conventional processes. For example, a pressurized stream of the flooding suspension may be pumped into an injection well extending to a desired depth in the subterranean formation, and may infiltrate (e.g., permeate, diffuse, etc.) into interstitial spaces of the subterranean formation. The extent to which the flooding suspension infiltrates the interstitial spaces of the subterranean formation at least partially depends on the properties of the flooding suspension (e.g., density, viscosity, material composition, etc.), and the hydrocarbon materials (e.g., molecular weight, density, viscosity, etc.) contained within interstitial spaces of the subterranean formation.

The extraction process 104 may include flowing (e.g., driving, sweeping, forcing, etc.) the stabilized emulsion from the subterranean formation to the surface. The surfactants formed by the organic base may prevent the dispersed material from coalescing and enable substantial removal of hydrocarbons from the subterranean formation.

Once the hydrocarbons are removed from the subterranean formation, separation process 106 may include destabilizing at least a portion of the emulsion to form distinct, immiscible phases including an aqueous phase and a hydrocarbon phase and separating the hydrocarbon material from the emulsion. One or more properties (e.g., temperature, pH, material composition, pressure, etc.) of the stabilized emulsion or the aqueous phase may be modified (e.g., altered, changed) to a least partially destabilize the emulsion. For example, the pH of the aqueous phase may be modified to destabilize the emulsion and form distinct, immiscible phases. In other embodiments, a demulsifier may be added to the emulsion to destabilize the emulsion.

Figure 2:
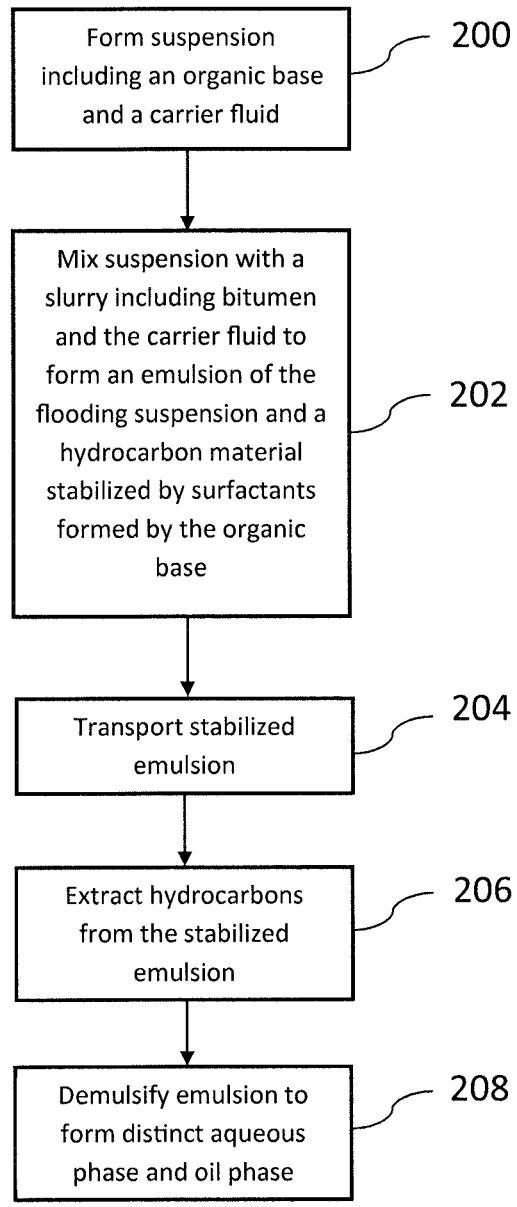
FIG. 2 is a simplified flow diagram depicting a method of recovering hydrocarbons from bituminous sand, in accordance with other embodiments of the disclosure.

Referring to FIG. 2, a simplified flow diagram illustrating a method of obtaining a hydrocarbon material from bitumen in accordance with other embodiments of the disclosure is shown. The method may include a suspension formation process 200 including forming a suspension including the organic base and a carrier fluid; a mixing process 202 including mixing the suspension with a slurry including the bitumen and the carrier fluid to form a stabilized emulsion comprising surfactants formed from the organic base; a transportation process 204 including hydrotransporting the emulsion; an extraction process 206 including extracting hydrocarbons from the stabilized emulsion; and a emulsion destabilization process 208 including destabilizing (e.g., demulsifying precipitating, etc.) the emulsion into distinct, immiscible phases.

The suspension formation process 200 may include forming a suspension including the organic base and at least one carrier fluid. The carrier fluid may include any of the fluids described above with reference to the carrier fluid of FIG. 1. The suspension may be formulated to include a concentration of the organic base similar to the flooding suspension described above with reference to FIG. 1.

The mixing process 202 may include mixing the suspension with a slurry including a bitumen (e.g., bituminous sand) and the carrier fluid to form a stabilized emulsion. The slurry may include steam, hot water (e.g., condensate), caustic soda, and the bitumen. The transportation process 204 may include hydrotransporting the slurry to a location where the stabilized emulsion may be processed to remove hydrocarbons therefrom (e.g., from the bitumen). In some embodiments, the mixing process 202 may be performed simultaneously with the transportation process 204. A temperature of the slurry may be adjusted to increase the solubility of the organic base in the slurry and increase the rate of the acid-base neutralization reaction and saponification during the mixing process 202 and the transportation process 204, which in turn may lead to effective in situ surfactant generation.

The organic base may be structured and formulated to facilitate formation of a stabilized emulsion of a hydrocarbon material and an aqueous phase. For example, the organic base may be structured and formulated to gather at, adhere to, and/or adsorb to interfaces of the hydrocarbon material and the aqueous material to form a emulsion comprising units (e.g., droplets) of one of the hydrocarbon material and the aqueous material in the other of the hydrocarbon material and the aqueous material.

The extraction process 206 may include extracting hydrocarbons from the stabilized emulsion. In some embodiments, the extraction process 206 includes extracting hydrocarbons from the stabilized emulsion of the slurry in a floatation process.

After the hydrocarbons are removed from the aqueous phase in the floatation process, at least a portion of the stabilized emulsion may be destabilized in the emulsion destabilization process 208 to form distinct, immiscible phases including an aqueous phase and a hydrocarbon phase. One or more properties (e.g., temperature, pH, material composition, pressure, etc.) of the stabilized emulsion or the aqueous phase may be modified (e.g., altered, changed) to a least partially destabilize the emulsion. For example, the pH of the aqueous phase may be modified to destabilize the emulsion and form distinct, immiscible phases. In other embodiments, a demulsifier may be added to the emulsion to destabilize the emulsion and form distinct, immiscible phases including an aqueous phase and a hydrocarbon phase.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of obtaining a hydrocarbon material, the method comprising:
   combining an organic base with a carrier fluid to form a suspension, the organic base selected from the group consisting of at least one of propylene diamine, butylene diamine, poly(vinylpyridine), polyvinyl imidazole, polyacrylamide, poly(N-isopropylacrylamide), tripropylamine, dibutylamine, tributylamine, and combinations thereof, wherein the organic base reacts with an acid at a temperature greater than about 250° C.;
   contacting at least one of a subterranean formation comprising bitumen or a slurry comprising bitumen with the suspension to form an emulsion comprising at least one of a cationic surfactant and an anionic surfactant, the organic base, and the carrier fluid; and
   separating a hydrocarbon material from the emulsion.

2. The method of claim 1, wherein the contacting at least one of a subterranean formation comprising bitumen or a slurry comprising bitumen with the suspension to form an emulsion comprises forming a cationic surfactant comprising a conjugate acid of the organic base.

3. The method of claim 1, wherein the separating a hydrocarbon material from the emulsion comprises altering a pH of the emulsion.

4. The method of claim 1, further comprising selecting the organic base to comprise tripropylamine, dibutylamine, or tributylamine.

5. The method of claim 1, further comprising selecting the organic base to comprise poly(vinylpyridine), polyvinyl imidazole, polyacrylamide, or poly(N-isopropylacrylamide).

6. The method of claim 1, further comprising selecting the organic base to comprise propylene diamine or butylene diamine.

7. A method of extracting a hydrocarbon material, the method comprising:
mixing a compound comprising an organic base with a carrier fluid to form a mixture, wherein the compound reacts with an acid in a hydrocarbon-containing material at a temperature greater than about 250° C.;
adding amine functionalized nanoparticles comprising one or more of silica, a metal, or a metal oxide to the mixture to form a flooding suspension including the amine functionalized nanoparticles and the compound;
contacting the hydrocarbon-containing material with the flooding suspension and reacting the compound with acids present in the hydrocarbon-containing material to form an emulsion comprising surfactants where the compound contacts the hydrocarbon-containing material;
transporting the emulsion; and
removing hydrocarbons from the emulsion.

8. The method of claim 7, wherein the mixing a compound comprising an organic base with a carrier fluid comprises heating the carrier fluid prior to mixing the compound with the carrier fluid.

9. The method of claim 7, wherein the mixing a compound comprising an organic base with a carrier fluid comprises forming the mixture to have between about 20 ppm and about 1,000 ppm of the compound.

10. The method of claim 7, further comprising selecting the compound to comprise an amine group coupled to one of an epoxy group or a halogen atom.

11. The method of claim 7, further comprising selecting the compound to comprise a polymer.

12. The method of claim 7, further comprising selecting the compound from the group consisting of ethanol amine, diethanol amine, triethanol amine, or a mixture thereof.

13. The method of claim 7, further comprising selecting the compound to comprise an amine coupled to a hydrophobic group selected from the group consisting of methanol, ethanol, propanol, butanol, pentanol, hexanol, heptanol, octanol, dodecanol, or octadecanol.

14. The method of claim 7, further comprising selecting the compound to comprise an amine group coupled to one of a nitrate group, a nitro group, or an azo group.

* * * * *